(12) United States Patent
Ebina et al.

(10) Patent No.: US 6,971,866 B2
(45) Date of Patent: Dec. 6, 2005

(54) DIE FOR MOLDING DISC SUBSTRATES

(75) Inventors: Toshiyuki Ebina, Aichi-ken (JP); Kazuki Nishi, Aichi-ken (JP)

(73) Assignee: Kabushiki Kaisha Meiki Seisakusho, Aichi-ken (JP)

( * ) Notice: Subject to any disclaimer, the term of this patent is extended or adjusted under 35 U.S.C. 154(b) by 0 days.

(21) Appl. No.: 10/830,075

(22) Filed: Apr. 23, 2004

(65) Prior Publication Data

US 2004/0228941 A1 Nov. 18, 2004

(30) Foreign Application Priority Data

May 14, 2003 (JP) .............................. 2003-135230

(51) Int. Cl.[7] ............................................. B29D 11/00
(52) U.S. Cl. .................. 425/192 R; 425/542; 425/810
(58) Field of Search .......................... 425/190, 192 R, 425/542, 810; 264/1.33, 106, 107

(56) References Cited

U.S. PATENT DOCUMENTS

| | | | |
|---|---|---|---|
| 3,894,825 A | * | 7/1975 | Westermann ............... 425/195 |
| 5,326,240 A | * | 7/1994 | Kudo et al. .................... 425/3 |
| 5,466,145 A | * | 11/1995 | Takahashi ................... 425/190 |
| 5,607,705 A | * | 3/1997 | Asai ........................... 425/190 |

OTHER PUBLICATIONS

Patent Abstracts of Japan, 07-214604, Aug. 8, 1995, Disc Substrate Mold With Stamper Loading/Unloading Device.

* cited by examiner

Primary Examiner—Donald Heckenberg
(74) Attorney, Agent, or Firm—Browdy and Neimark, PLLC

(57) ABSTRACT

The present invention provides a stamper holding mechanism that is stable, cannot be loosened, that does not use frictional forces and is not affected by vibration and temperature variations. To that end, there is provided a die, for molding disc substrates, that forms a cavity 23 by providing a stamper 10 on either one or both of a stationary mirror plate 8 of a stationary die 1 and a movable mirror plate 16 of a movable die 11, including: rotation mechanism for allowing a holding member, which holds the stamper 10 on the mirror plate and which can be removable, to advance or retreat; and engagement mechanism for abutting on the rotation mechanism to be engaged therewith in a direction to remove the holding member when the rotation mechanism is rotated in the direction.

2 Claims, 3 Drawing Sheets

DIE FOR MOLDING DISC SUBSTRATES

BACKGROUND OF THE INVENTION

1. Field of the Invention

The present invention relates to a die, for molding disc substrates, having a function to change stampers and, in particular, it relates to a technique for preventing loosening of a stamper holding mechanism while a stamper is mounted and a molding operation is performed.

2. Description of the Related Art

FIG. 3 shows an example of a prior art die, for molding disc substrates, having a function to change stampers. In this example, an inner stamper holder 18 holds a center hole of a stamper 10 mounted on a surface of a movable mirror plate 16 to install the stamper 10 on the movable mirror plate 16. The inner stamper holder 18 can advance or retreat in an axial direction perpendicular to a surface of the stamper 10 by rotation of a pinion rod 24b via a gear 25. A flange portion 31 provided at the outward end of the pinion rod 24b is pinched between a holding plate 32 and an intermediate plate 13, wherein the rotation of the pinion rod 24b is prevented by pressing the holding plate 32 against the intermediate plate 31 by a fixing screw 33.

Further, in another embodiment, as shown in Japanese Unexamined Patent Publication No. H07-214604, an attaching/detaching bush 20 that holds a center hole of a stamper plate 12 advances or retreats due to the rotation of an operating rod 22 meshing with a gear rack 21 provided on an outside surface of the attaching/detaching bush 20. The rotation of the operating rod 22 is prevented by tightening a lock nut 26, which is screwed on a male thread portion 24 provided on the outward part of the operating rod 22, onto a die plate 27.

In either of the prior art techniques, a member for holding the stamper, or its equivalent, prevents the rotation of a rotating member such as the pinion rod or the operating rod with the help of a frictional force generated by clamping using the holding plate or the lock nut. Therefore, if the force to prevent the rotation of the rotating member is reduced as a result of vibrations and thermal expansion due to temperature variations during molding processes, the member for holding the stamper and the like may be loosened and projected in the removing direction. In this case, the melted resin may flow in the center hole area of the stamper to create burrs or, in the worst case, the member for holding the stamper and the like may be projected significantly to collide against the opposite surface to damage the dies.

BRIEF SUMMARY OF THE INVENTION

In view of the above problem, it is an object of the present invention to provide a stamper holding mechanism that is stable and cannot be loosened and that does not use frictional forces and is not affected by vibrations and temperature variations.

Thus, according to the present invention, there is provided a die, for molding disc substrates, that forms a cavity by providing a stamper on either one or both of a stationary mirror plate of a stationary die and a movable mirror plate of a movable die, comprising: rotation means for allowing a holding member, which holds said stamper on the mirror plate and which can be attached or detached, to advance or retreat; and engagement means for abutting against the rotation means to be engaged therewith in a direction to remove said holding member when said rotation means is rotated in said direction.

BRIEF DESCRIPTION OF THE DRAWINGS

In the drawings elements designated by identical reference numerals have identical objects and functions throughout several views. In the drawings.

DETAILED DESCRIPTION OF THE INVENTION

Figure 1:
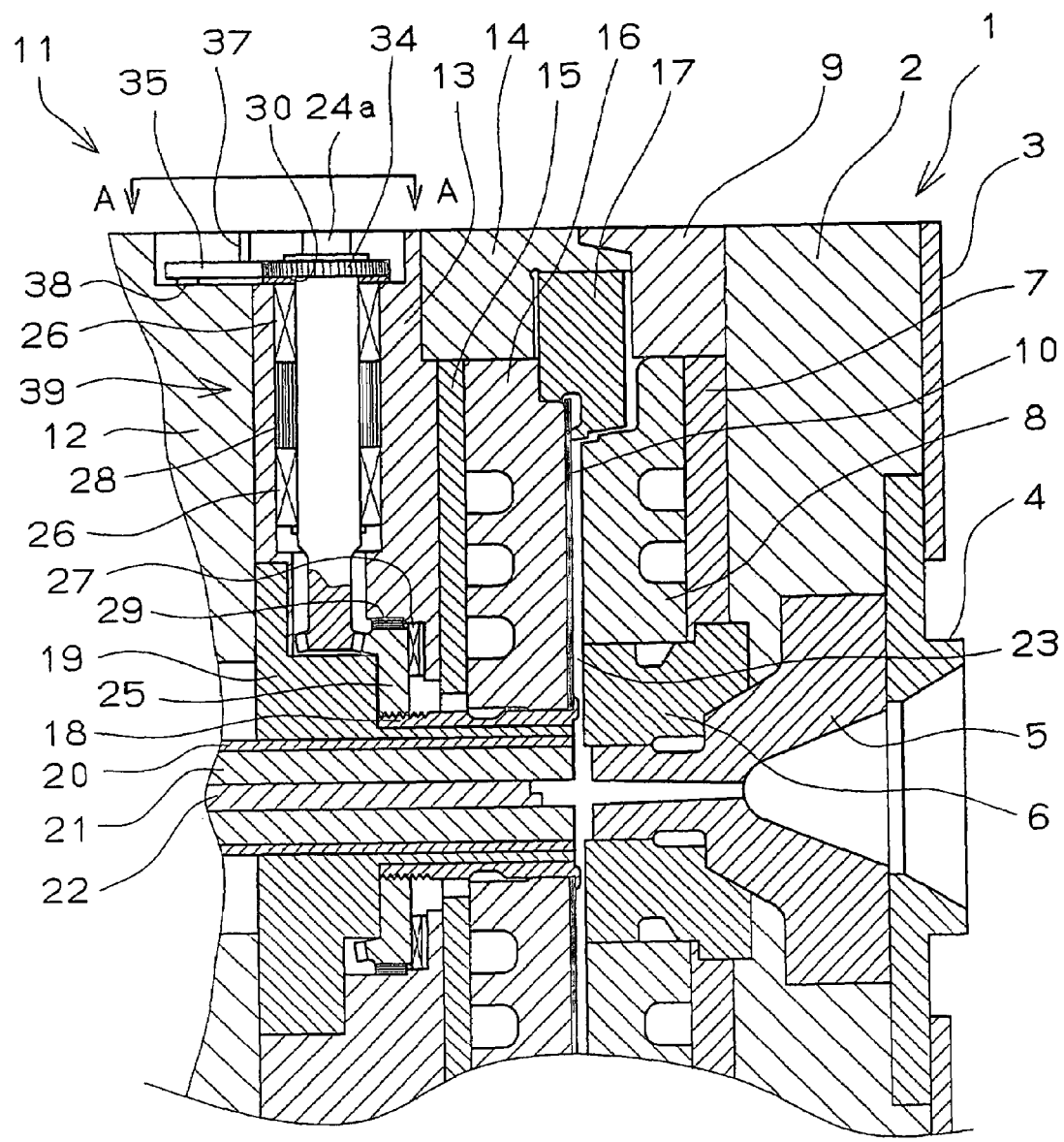
FIG. 1 is a cross-sectional view showing an important part of a die implementing the present invention.
Figure 2:
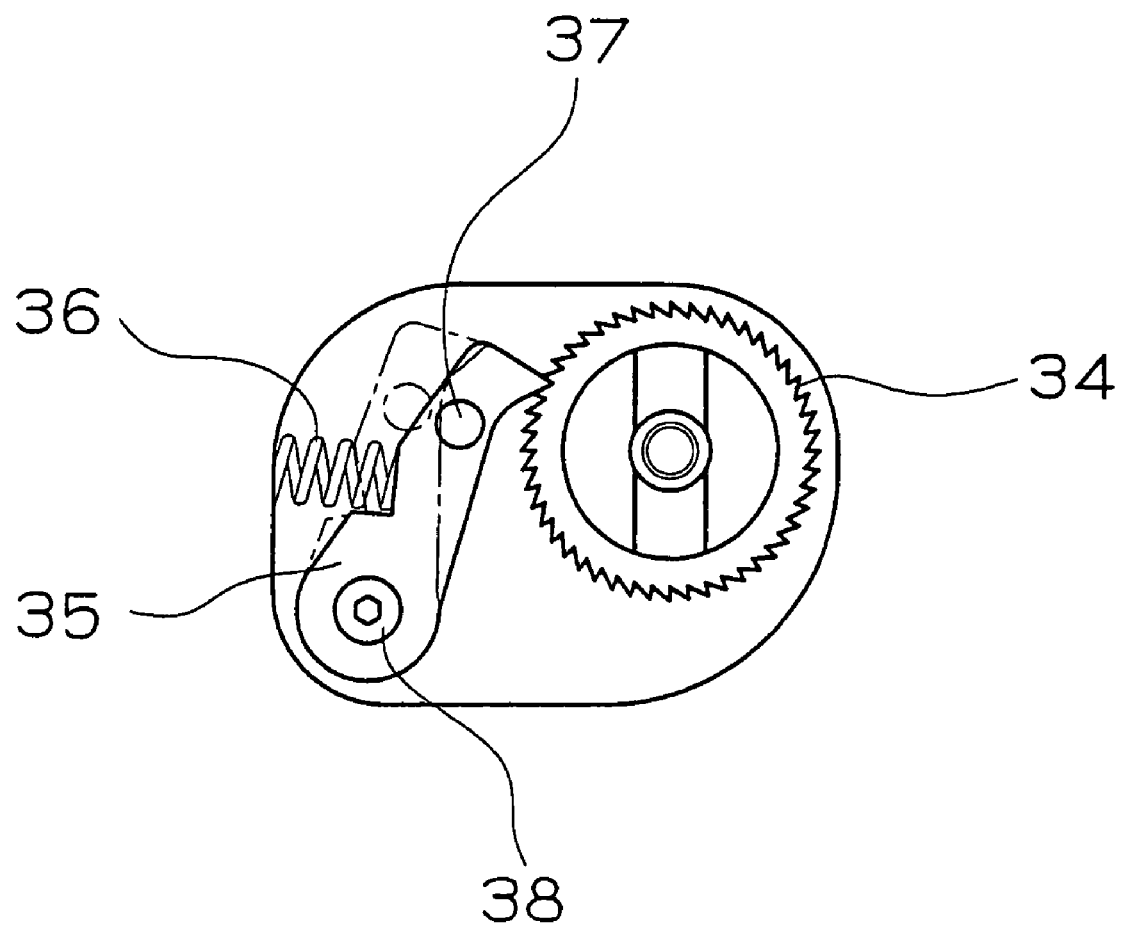
FIG. 2 is an enlarged view on arrow A—A in FIG. 1.
Figure 3:
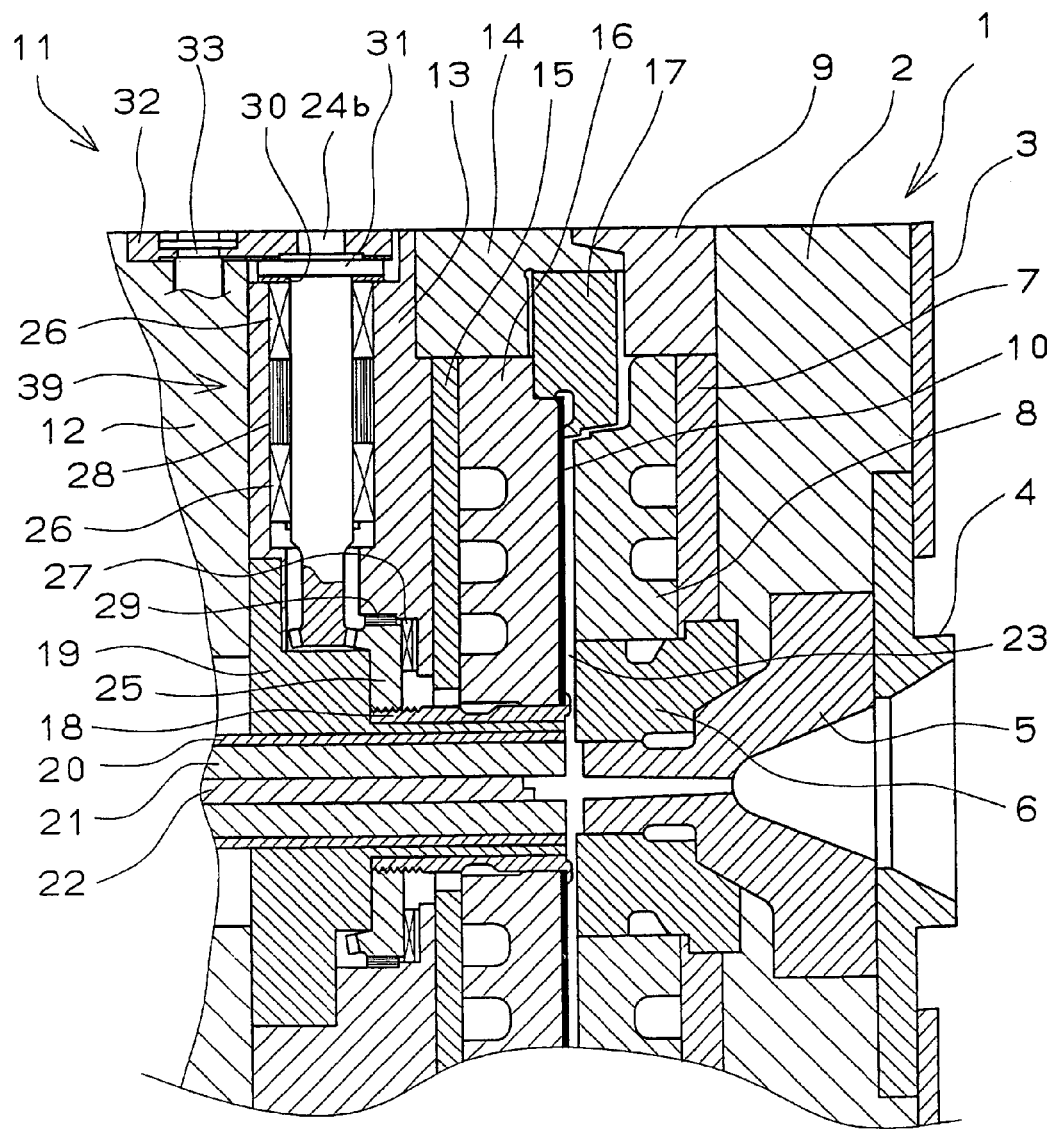
FIG. 3 is a cross-sectional view showing an important part of a prior art die.

A stationary die 1 is comprised of: a stationary die plate 2 that is attached to a stationary platen (not shown) of an injection molding machine via a thermal insulation plate 3; a stationary mirror plate 8 that is fastened to a surface of the stationary die plate 2, which is opposite to that faced by the thermal insulation plate 3, via a stationary back plate 7; a gate insert 6, a sprue bush 5 and a positioning plate 4 that are inserted through center openings of the stationary die plate 2, the stationary back plate 7 and the stationary mirror plate 8; and an stationary outer circumferential ring 9 that is inserted around end faces of the stationary back plate 7 and the stationary mirror plate 8 and fastened to the stationary die plate 2.

A movable die 11 is comprised of: a movable die plate 12; an intermediate plate 13 that is fastened to a surface of the movable die plate 12 facing the stationary die 1; a movable mirror plate 16 that is fastened to a surface of the intermediate plate 13 facing the stationary die 1 via a movable back plate 15; a stamper 10 that is disposed on a surface of the movable mirror plate 16 faced by the stationary mirror plate 8; an outer circumferential stamper holder 17 that pinches an outer circumferential end of the stamper 10 so that the stamper 10 is held on the movable mirror plate 16; an inner stamper holder 18 that acts as a holding member that is movably inserted through center openings of the intermediate plate 13, the movable back plate 15 and the movable mirror plate 16 to pinch an inner circumferential end of the stamper 10 so that the stamper 10 is held on the movable mirror plate 16; a stationary sleeve 19 that guides an internal hole of the inner stamper holder 18 and is fastened to the movable die plate 12; an ejector 20 that is inserted through an internal hole of the stationary sleeve 19 slidably in the axial direction; a male cutter 21 that is inserted through an internal hole of the ejector 20 slidably in the axial direction; an ejector pin 22 that is inserted through an internal hole of the male cutter 21 slidably in the axial direction; a movable outer circumferential ring 14 that is inserted around outer circumferential end faces of the movable back plate 15 and the movable mirror plate 16 and fastened to the intermediate plate 13; and a rotation means 39 that drives the inner stamper holder 18 to advance or retreat in the axial direction. The movable die 11 is aligned with the stationary die 1 described above to constitute a die and form a cavity 23 therebetween.

The inner stamper holder 18 acting as a holding member which can be attached or detached, is a cylindrical member that has an outside diameter to allow the inner stamper holder 18 to be inserted through an inner circumferential hole of the stamper 10 with a slight clearance and is equipped with a collar, on one end face thereof, for holding the stamper 10 by engaging with the end portion of the inner circumferential hole of the stamper 10. An outer circumferential surface of the other end of the inner stamper holder 18 is provided with male threads, which are screwed with female threads provided on an inner circumference of a gear 25. An outer circumferential end face of the gear 25 is guided into a hole provided in the axial direction of the intermediate plate 13 via a bush 29 and a surface perpendicular to the axis of the gear 25 is held by the intermediate plate 13 via a bearing 27 to receive a force in the axial direction. An outer circumferential side of the gear 25 is provided with teeth which mesh with a pinion provided at a tip portion of a pinion rod 24a. The pinion rod 24a is rotatably held via a bearing 26 and a bush 28 in a vertical hole provided in the intermediate plate 13 in the direction normal to the axis of the die and also held in the axial direction by a bush 30. Though the rotation means is constituted by the pinion rod 24a and the gear 25 in the above description, other rotation means such as, for example, that shown in Japanese Unexamined Patent Publication No. H07-214604, as mentioned above, may also be adopted.

The other end of the pinion rod 24a opposite to the pinion is provided with a flange-like portion and an outer circumferential surface of the flange-like portion is provided with a ratchet 34. The ratchet 34 has a sawtooth-like shape and is provided with a pawl 35 so as to permit clockwise rotation and prevent counterclockwise rotation from the viewpoint of A—A.

The pawl 35 is a plate-like member, one end of which is rotatably attached to a rotation shaft 38 standing vertically on the movable die plate 12 and the other end of which is moved arcuately. A tip portion of the pawl 35 that is moved arcuately is shaped so that it abuts against sawtooth-shaped flanks of the ratchet 34 that are disposed substantially along radial lines from the central axis of the ratchet 34. A spring 36 is provided between the intermediate plate 13 and a side of the pawl 35 that is opposite to that faced by the ratchet 34 and is perpendicular to the rotation shaft 38 so as to press the tip portion of the pawl 35 against the ratchet 34 continuously. A knob 37 is placed, vertically, on the outward surface in the neighborhood of the tip portion of the pawl 35 so that the top end of the knob 37 can be manipulated easily from the side of the movable die 11. Though the engagement means is constituted by the ratchet 34 and the pawl in the above description, other engagement means of different configurations may also be adopted so long as the engagement means employ the engagement of members abutting against each other, such as those by a penetrating hole and a pin and the like.

An operation for changing the stamper 10 will be described. In order to remove the stamper 10 that has been used in the preceding molding process, the movable die 11 is moved away from the stationary die 1 adequately and the outer circumferential stamper holder 17 is removed. First, the knob 37 is manipulated to rotate the pawl 35 so that the pawl 35 is moved away from the ratchet 34 against the elastic force of the spring 36 so as to disengage the pawl 35 from the ratchet 34. Next, a handle (not shown) is attached to the end of the pinion rod 24a and rotated in a counterclockwise direction. As the pinion rod 24a rotates the gear 25, the inner stamper holder 18, which is screwed with the gear 25 and which is prevented from being rotated by a key (not shown) and permitted to be moved in the axial direction, is moved in the direction to unscrew it from the gear 25. After the inner stamper holder 18 is moved till it is unscrewed from the gear 25, the inner stamper holder 18 is removed to the outside of the movable die 11 along with the stamper 10.

Next, the newly prepared stamper 10, with the inner stamper holder 18 inserted therethrough, is inserted into the movable die 11 and the handle is rotated in a clockwise direction. Meanwhile, the pawl 35 goes over the sawtooth-like ratchet 34 to permit the clockwise rotation of the pinion rod 24a. The inner stamper holder 18 is screwed with the gear 25 and further advances till its end face abuts on the stationary sleeve 19. At this time, the collar of the inner stamper holder 18 is engaged with the inner circumferential hole portion of the stamper 10 with an appropriate clearance so that the stamper 10 is attached properly. Then, the pawl 35 is engaged with the ratchet 34 to prevent a rotation of the pinion rod 24a in the counterclockwise direction, i.e., a detaching direction of the inner stamper holder 18. Therefore, the stamper holding mechanism is stable without being affected by vibrations and temperature variations and the loosening of the inner stamper holder 18 that acts as a holding member for the stamper 10 is prevented.

When disc substrates are molded in the die to which the stamper 10 is attached as described above, a die clamping device (not shown) allows the movable outer circumferential ring 14 of the movable die 11 to abut and be held to the stationary outer circumferential ring 9 of the stationary die 1 and an injection device (not shown) that abuts against the sprue bush 5 injects melted resin to fill the cavity 23.

Though an example in which the stamper 10 is provided on the movable die 11 is shown in this embodiment, the stamper 10 may be provided on the stationary die or on both the movable and stationary dies. Correspondingly, the holding member, the rotation means and the engagement means may be attached to the die to which the stamper 10 is attached.

What is claimed is:

1. A die for molding disc substrates, that forms a cavity by providing a stamper on either one or both of a stationary mirror plate of a stationary die and a movable mirror plate of a movable die, comprising
    rotation means for allowing a holding member, which holds said stamper on either of the mirror plates and which can be attached or detached, to advance or retreat; and
    engagement means for abutting on the rotation means preventing rotation of said holding member.

2. A die for molding disc substrates according to claim 1, wherein said engagement means is comprised of: a ratchet provided in said rotation means; and a pawl to be engaged with said ratchet.

* * * * *